(12) United States Patent
Ueno et al.

(10) Patent No.: US 6,440,583 B1
(45) Date of Patent: Aug. 27, 2002

(54) ALUMINUM ALLOY FOR A WELDED CONSTRUCTION AND WELDED JOINT USING THE SAME

(75) Inventors: Seizo Ueno; Yoichiro Bekki, both of Tokyo; Noboru Hayashi, Wako, all of (JP)

(73) Assignees: The Furukawa Electric Co., Ltd., Tokyo (JP); Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/699,091

(22) Filed: Oct. 26, 2000

(51) Int. Cl.[7] .................. B32B 15/20; C22C 21/02; B23K 31/02
(52) U.S. Cl. .................. 428/654; 148/516; 148/535; 148/439; 148/440; 219/76.14; 219/137 WM; 219/146.22; 228/231; 228/249; 228/251; 228/262.5; 420/532; 420/534; 420/535; 420/537; 420/538; 420/541; 420/544; 420/546; 420/547; 420/548; 420/551; 428/626; 428/934
(58) Field of Search .................. 428/654, 636, 428/934; 219/76.14, 137 WM, 146.22; 228/231, 249, 251, 262.5; 148/535, 516, 439, 440; 420/532, 534, 535, 537, 538, 541, 544, 546, 547, 548, 551

(56) References Cited

U.S. PATENT DOCUMENTS 5,906,897 A * 5/1999 Tanaka et al. .............. 428/654

FOREIGN PATENT DOCUMENTS

| EP | 0637481 A1 | 2/1995 | |
|---|---|---|---|
| JP | 5-271834 A | * 10/1993 | ........... C22C/21/02 |
| JP | 9157807 | 6/1997 | |
| JP | 11131166 | 5/1999 | |

OTHER PUBLICATIONS

European Search Report from application EP 01111944 dated Aug. 10, 2001.

* cited by examiner

Primary Examiner—Robert R. Koehler
(74) Attorney, Agent, or Firm—Knobbe Martens Olson & Bear LLP

(57) ABSTRACT

Disclosed is an Al alloy for a welded construction having excellent welding characteristics, which Al alloy comprises 1.5 to 5 wt % of Si (hereinafter, wt % is referred to as %), 0.2 to 1.5% of Mg, 0.2 to 1.5% of Zn, 0.2 to 2% of Cu, 0.1 to 1.5% of Fe, and at least one member selected from the group consisting of 0.01 to 1.0% of Mn, 0.01 to 0.2% of Cr, 0.01 to 0.2% of Ti, 0.01 to 0.2% of Zr, and 0.01 to 0.2% of V, with the balance being Al and inevitable impurities. Also disclosed is a welded joint having this Al alloy base metal welded with an Al—Mg- or Al—Si-series filler metal.

15 Claims, 1 Drawing Sheet

ALUMINUM ALLOY FOR A WELDED CONSTRUCTION AND WELDED JOINT USING THE SAME

FIELD OF THE INVENTION

The present invention relates to Al alloys for a welded construction, which alloys are excellent, particularly in welding characteristics, in addition to general characteristics, such as mechanical strength and bending processability. The present invention also relates to welded joints using the Al alloys for a welded construction, which are used in automotive frames, bodies, and other parts requiring lightweight, inexpensive and high-mechanical strength welded joints.

In the specification and claims, all compositions of Al alloys are meant to be expressed in % by weight, which is referred to simply as %.

BACKGROUND OF THE INVENTION

Hitherto, cold-rolled steel sheets have been mainly used in automobiles. However, the demand for lightweight automotive bodies has increased in recent years from the viewpoint of reducing fuel consumption for automobiles, and use of sheets-(or plates) and extruded materials of Al alloys, in place of steel sheets, is being studied and is actually used in some parts.

Such Al alloy sheets are required, as automotive materials, to have excellent press workability, high mechanical strength, high weld strength, excellent corrosion resistance, etc.

The Al alloy extruded materials are required to have excellent bending workability, high mechanical strength, high weld strength, and excellent corrosion resistance.

As Al alloy materials meeting such requirements, Al—Mg—Si series alloys (6000 series alloys), such as 6061 alloy, and Al—Mg series alloys (5000 series alloys), such as 5052 alloy, have been used in sheet materials, and Al—Mg—Si series alloys (6000 series alloys), such as 6061, 6N01, and 6063 alloys, have been used in extruded materials.

However, the 6000 series alloys and 5000 series alloys described above lack satisfactory mechanical strength, and particularly, their welds (welded joints) by arc welding are poor in mechanical strength.

SUMMARY

The objects of the present invention that are described above have been achieved by the following means:

(1) An Al alloy for a welded construction having excellent welding characteristics, wherein the Al alloy comprises 1.5 to 5% by weight of Si (hereinafter, % by weight is referred to as %), 0.2 to 1.5% of Mg, 0.2 to 1.5% of Zn, 0.2 to 2% of Cu, 0.1 to 1.5% of Fe, and at least one member selected from the group consisting of 0.01 to 1.0% of Mn, 0.01 to 0.2% of Cr, 0.01 to 0.2% of Ti, 0.01 to 0.2% of Zr, and 0.01 to 0.2% of V, with the balance being Al and inevitable impurities.

(2) The Al alloy for a welded construction according to item (1), wherein the amount of Si is from 2.6 to 5%.

(3) A welded joint having a weld (weld zone) excellent in mechanical strength, which is formed by arc-welding with an Al alloy filler metal containing 2 to 6% of Mg, a base metal being an Al alloy that comprises 1.5 to 5% of Si, 0.2 to 1.5% of Mg, 0.2 to 1.5% of Zn, 0.2 to 2% of Cu, 0.1 to 1.5% of Fe, and at least one member selected from the group consisting of 0.01 to 1.0% of Mn, 0.01 to 0.2% of Cr, 0.01 to 0.2% of Ti, 0.01 to 0.2% of Zr, and 0.01 to 0.2% of V, with the balance being Al and inevitable impurities.

(4) The welded joint according to item (3), wherein the central metal components in the weld described in item (3) comprise 0.5 to 4% of Si, 1.0 to 5.5% of Mg, and 0.05 to 1.4% of Cu.

(5) The welded joint according to item (3) or (4), wherein the weld described in item (3) after welding is heat-treated, to form a high-mechanical strength, age-hardened weld.

(6) A welded joint having a weld excellent in weld cracking property, which is formed by arc-welding with an Al alloy filler metal containing 3 to 13% of Si, a base metal being an Al alloy that comprises 1.5 to 5% of Si, 0.2 to 1.5% of Mg, 0.2 to 1.5% of Zn, 0.2 to 2% of Cu, 0.1 to 1.5% of Fe, and at least one member selected from the group consisting of 0.01 to 1.0% of Mn, 0.01 to 0.2% of Cr, 0.01 to 0.2% of Ti, 0.01 to 0.2% of Zr, and 0.01 to 0.2% of V, with the balance being Al and inevitable impurities.

(7) The welded joint according to item (6), wherein the central metal components in the weld described in item (6) comprise 2.0 to 11% of Si, 0.05 to 1.4% of Mg, and 0.05 to 1.8% of Cu.

DETAILED DESCRIPTION

Figure 1:
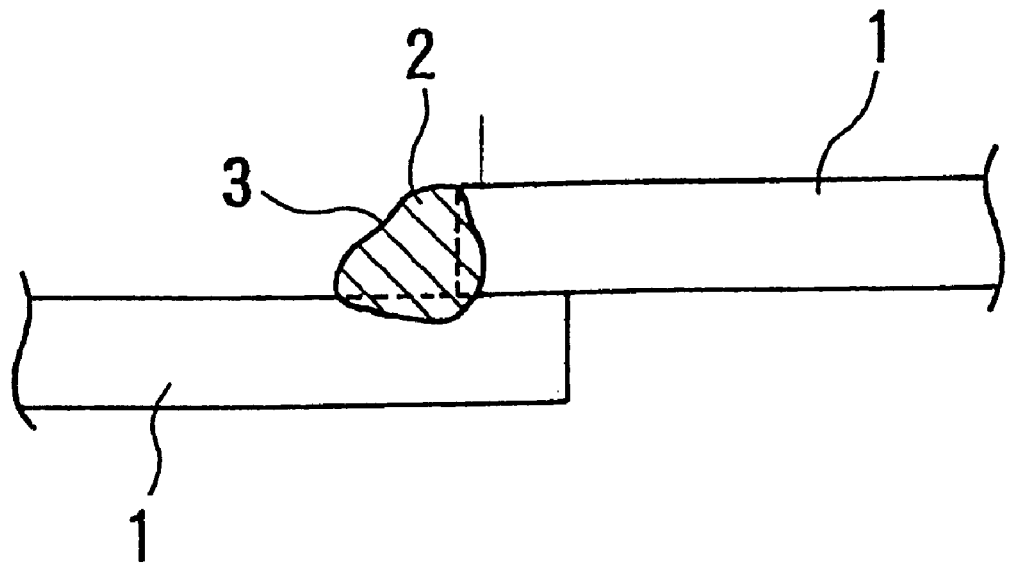
FIG. 1 is a cutaway view of a welded joint in accordance with one embodiment of the invention.

Hereinafter, the present invention is described in detail.

One embodiment of the present invention is an aluminum alloy containing weld enhancing elements such as silicon and magnesium.

Si has the effect of increasing the mechanical strength of the alloy material, while securing necessary elongation. When the Al alloy, as a base metal, is arc-welded with an Al—Mg series filler metal, Si has the effect of lowering the melting point of the weld, and preventing cracking of the weld.

The content of Si shall be 1.5 to 5%, preferably 2.6 to 5%. If the content is too low, the effect (strength, weld cracking) described above is insufficient, whereas if the content is too high, the elongation of the material is lowered, to worsen press workability and bending processability.

Mg forms an intermetallic compound with Si described above, to improve the mechanical strength by precipitation of $Mg_2Si$.

The content of Mg shall be 0.2 to 1.5%, preferably 0.2 to 0.8%. If the content is too low, the strength is insufficient, while if the content is too high, the elongation is lowered.

Zn improves surface treatment ability of the Al alloy, thereby improving degreasing property and chemical conversion property.

The content of Zn shall be 0.2 to 1.5%, preferably 0.2 to 1.2%. If the content is too low, the chemical conversion property is inferior, while if the content is too high, the corrosion resistance is deteriorated.

Cu lowers the electrical conductivity and melting point of the Al alloy, and improves the spot weldability. Further, Cu also contributes to the improvement of impact absorption energy, due to increased strength of the Al alloy.

The content of Cu shall be 0.2 to 2%, preferably 0.2 to 1.2%. If the content is too low, its action is insufficient, while if it is too high, the elongation is lowered, and cracking occurs easily upon welding.

Fe contributes to the improvement of toughness and impact absorption energy, by forming fine crystal grains.

The content of Fe shall be 0.1 to 1.5%, preferably 0.2 to 1.2%. If the content is too low, its action is insufficient, while if the content is too high, the surface state of the resultant alloy is worsened, due to the phase of coarse constituent particles.

The element selected from Mn, Cr, Ti, Zr, and V improves the elongation and toughness of the Al alloy, by forming fine crystal grains, thereby press processability, bending processability, and energy absorptivity are improved.

Further, cracking hardly occurs upon welding, because of the formation of fine crystal grains.

The content of Mn when added shall be 0.01 to 1.0% preferably 0.05 to 0.6%, while the content of Cr when added shall be 0.01 to 0.2%, preferably 0.01 to 0.1%.

The content of each of Ti, Zr, and V when added shall be 0.01 to 0.2%, preferably 0.01 to 0.1%.

Because the Al alloy according to the present invention contains large amounts of Si and Zn, various kinds of metal scrap (aluminum scrap) can be utilized as the raw materials by recycling, thus achieving lower costs.

Utilizable recycled scrap includes, for example, recovered scrap of aluminum cans, scrap of aluminum sashes, scrap of automotive engines made of aluminum, scrap of parts, etc.

The Al alloy referred to in the present invention is a so-called wrought Al alloy material, including a sheet produced by usual rolling and an extruded material produced by usual extrusion.

The material is used after solid solution treatment and quenching, followed by heat-treatment for age hardening, in the production process, as is evident from the Examples described below.

In one advantageous embodiment the amount of Si in the alloy composition is particularly 2.6 to 5%.

When this alloy, thus constituted as a base metal, is arc-welded with an Al—Mg series filler metal, Si can lower the melting point of a weld, thereby reducing weld cracking in the weld, and improving the strength of the welded joint.

In one embodiment, the invention comprises a welded joint having a weld excellent in mechanical strength, formed by arc-welding the above-described Al alloy for a welded construction, as a base metal, with an Al alloy filler metal containing 2 to 6% of Mg.

The Al alloy filler metal containing 2 to 6% of Mg is a wire or a welded bar of, for example, A5356 (typical example, Al-5%Mg-0.1%Mn-0.1%Cr-0.1%Ti alloy), A5554 (typical example, Al-2.7%Mg-0.8%Mn-0.1%Cr-0.1%Ti alloy), A5183 (typical example, Al-4.8%Mg-0.8%Mn-0.15%Cr alloy), etc.

The Al alloy base metal for a welded construction (sheet material or extruded material) described above is arc-welded with any of these filler metals, thereby forming a welded joint having a weld excellent in mechanical strength.

The reason a welded joint having a weld excellent in mechanical strength can be obtained, is that the filler metal, containing Mg, and the base metal, containing Si, are alloyed at a welded metal portion (weld), and this welded metal portion is subjected to natural aging or artificial aging (high-temperature aging), thereby $Mg_2Si$ is precipitated, to form a high-mechanical strength welded metal portion, to improve the strength of the joint.

The filler metal used in this welding makes use of an Al alloy wire or welded bar containing 2 to 6% of Mg described above, but if the content of Mg is too low, its effect is insufficient, while if the content is too high, the toughness of the welded metal portion is lowered. Further, production of the filler metal (wire or welded bar) itself becomes difficult, when the Mg content is outside of the above-defined range.

A preferred embodiment of a joint, using the process described above may comprise 0.5 to 4% of Si, 1.0 to 5.5% Mg, and 0.05 to 1.4% Cu by weight.

That is, a welded joint excellent in mechanical strength can be obtained by the metal components at the central portion of the welded portion of the joint in the range of 0.5 to 4% of Si, 1.0 to 5.5% of Mg, and 0.05 to 1.4% of Cu.

In the welded joint, Si and Cu are eluted from the base metal to the weld, while the majority of Mg is eluted from the filler metal.

Si and Mg are precipitated as $Mg_2Si$ in the welded metal portion, to increase the mechanical strength. If its amount is too low, its effect is insufficient, while if the amount is too high, the toughness is lowered.

Further, Cu improves the strength of the welded metal portion. If the amount is too low, the strength is insufficient, while if the amount is too high, the toughness is lowered and weld cracking easily occurs.

In the welding described above, base metals, each consisting of the Al alloy for a welded construction according to the present invention, are combined and welded, but a base metal of the Al alloy for a welded construction according to the present invention, and a base metal of other Al alloy (for example 6N01, 6063, 5052, 5182, etc.), can be combined and welded, to achieve the similar effect, insofar as the central metal components in the resultant weld are within the above-defined range.

Subsequent to welding, a preferred embodiment of the joint is heat-treated, to form a high-mechanical strength, age-hardened weld.

That is, the weld may be subjected to natural age hardening, by leaving it at room temperature after welding, but the weld shall be subjected to heat treatment (high-temperature aging or artificial aging) after welding, thereby precipitating $Mg_2Si$, to achieve a further high-mechanical strength, age-hardened weld and welded joint.

This heat treatment is preferably artificial aging at 150 to 220° C. for 20 minutes to 24 hours. The effect may be insufficient if heat treatment is conducted at 150° C. for less than 20 minutes, while softening may be caused by heat treatment at 220° C. for more than 24 hours.

This heat treatment may also serve as heating in, for example, a step of coating automobiles on an assembly line.

Another preferred embodiment of this invention is a welded joint formed by arc-welding the above-described Al alloy for a welded construction, as a base metal, with an Al alloy filler metal containing 3 to 13% of Si.

The Al alloy filler metal containing 3 to 13% of Si is a wire or a welded bar of, for example, A4043 (typical example, Al-4.3% Si alloy), A4047 (typical example, Al-12% Si alloy), etc.

The Al alloy base metal for a welded construction (sheet material or extruded material) described above is arc-welded with any one of these filler metals, thereby forming a welded joint having an excellent weld, with less weld cracking.

The reason a joint having an excellent weld with less weld cracking can be obtained, is that Si, in the filler metal, lowers the melting point of the welded metal portion, improves melt flowability, and suppresses weld cracking, more significantly than by a filler metal which comprises Mg as a major component.

Si, in this filler metal, and the Al alloy (base metal) according to the present invention, are mixed upon welding, thereby Si, Zn, and Cu contained in the base metal work together, to further lower the melting point of the welded metal portion, thereby further making weld cracking unlikely to occur.

Further, this filler metal can also be used to effect welding, even when weld cracking occurs easily because of the material and structure of a counterpart alloy to be welded.

The filler metal to be used in this welding makes use of an Al alloy wire or welded bar containing 3 to 13% of Si, as described above, but if the content of Si is too low, its effect is insufficient, while if the content is too high, primary crystals of Si occur, thus not only lowering the toughness of the welded metal portion but also making production of the filler metal (wire or welded bar) itself difficult.

A preferred embodiment of a joint, using the process described above may comprise 2.0 to 11% of Si, 0.05 to 1.4% Mg, and 0.05 to 1.8% Cu by weight.

That is, an excellent welded joint can be obtained by central metal components in the welded portion of the joint in the range of 2.0 to 11% of Si, 0.05 to 1.4% of Mg, and 0.05 to 1.8% of Cu.

In the welded joint, Mg and Cu are eluted from the base metal to the weld, while the majority of Si is eluted from the filler metal.

Si improves weld cracking, as described above. If its amount is too low, its effect is insufficient, while if it is too high, initial crystals of Si are generated, to lower the toughness of the welded metal portion.

Further, Mg together with Si is precipitated as $Mg_2Si$ in the welded metal portion, to increase the mechanical strength. If its amount is too low, its effect is insufficient, while if it is too high, the toughness is lowered.

Further, Cu improves the mechanical strength of the welded metal portion. If its amount is too low, its effect is insufficient, while if it is too high, the toughness is lowered, and weld cracking tends to easily occur.

In the welding described above, base metals, each consisting of the Al alloy for a welded construction according to the present invention, are combined and welded, but a base metal of the Al alloy for a welded construction according to the present invention, and a base metal of other Al alloy (for example 6N01, 6063, 5052, 5182, etc.), can be combined and welded, to achieve the similar effect, insofar as the central metal components in the weld are within the above-defined range.

The Al alloy for a welded construction of the present invention has excellent welding characteristics, while securing general characteristics, such as mechanical strength and bending processability, required of automotive materials.

In the present invention, a welded joint excellent in mechanical strength and cracking property in a weld can be obtained by welding the said Al alloy as a base metal.

That is, when the Al alloy is welded by use of a filler metal comprising Mg as a major ingredient, the mechanical strength of the joint is increased, and the strength of the joint can be further improved by heating. In addition, when the Al alloy is welded by use of a filler metal comprising Si as a major ingredient, a stable welded joint can be obtained by minimizing weld cracking in the weld.

Because of these advantages, the present invention exihibits the industrially remarkable effect of achieving weight and cost reduction of automotive parts, such as an automotive frame, or the like.

Hereinafter, the present invention is described in more detail referring to the following examples, but it is not intended to limit the present invention by those examples.

EXAMPLE

As a sheet material, an ingot of dimensions 300 mm W×1200 mm L×120 mm T, having the composition shown in Table 1, was produced by casting and then subjected to homogenizing treatment at 520° C. for 1 hour.

Thereafter, hot-rolling was started at 480° C. and was finished at 340° C., to produce a sheet of 4 mm thickness, which was then cold-rolled into a sheet of 2 mm thickness.

This cold-rolled sheet was finally annealed at 530° C., cooled at 3° C./sec., and further subjected to aging treatment at 180° C. for 2 hours, to produce an Al alloy sheet for testing.

To produce an extruded material, a billet of dimensions 220 mm$\phi$×400 mm L, produced by casting the components in Table 1, was subjected to homogenizing treatment at 480° C. for 4 hours, then extruded at a billet temperature of 450° C. into a flat sheet of 100 mm W×2 mm T, and cooled with a fan. Thereafter, the sheet was aged at 180° C. for 2 hours, to produce an Al alloy extruded material of 2 mm thickness.

These test materials were examined for weld strength, bending processability of the materials, and weld cracking. The results are shown in Table 1.

Each test method for these characteristics is as follows:
1. Welding, metal components in a welded joint, and tensile test To produce the welded joint specimen of the Al alloy (sheet material, extruded material) shown in Table 1, the alloys were mutually overlaid by one pass, as shown in FIG. 1, and they were fillet-welded using a welding wire of 1.2 mm$\phi$, by an MIG welding machine.

In FIG. 1, (1) is Al alloys (base metals), (2) is a weld (welded metal portion), and (3) is a central metal portion in the weld.

The type of the wire used, and the measured amounts of the components Si, Mg, and Cu in the central metal portion (3) in the weld (2), are shown in Table 1.

To eliminate the influence of the boundary of the base metal and the welded metal, the welded metal around the center of the weld was subjected to emission spectroscopic analysis, to measure metal components at the weld.

The welded joint was analyzed at 3 points, at 10 mm intervals, in the longitudinal direction in the welded metal portion {FIG. 1 (2)}, in the vicinity of the center {FIG. 1 (3)}, and the average of these is shown in Table 1, as an analyzed value.

In a tensile test of the welded joint, a rectangular test specimen of 32 mm width was taken from the welded joint specimen, and then examined at a stress rate of 10 mm/min, in an instron-type tensile machine, to determine the maximum loading (kN). Separately, the welded joint specimen after heating was also examined in the tensile test. When the tensile strength is less than 6.5 kN, it is practically insufficient in joint strength.

2. Bending processability

The Al alloys (sheet material, extruded material) shown in Table 1 each were used to prepare bend-test specimen No. JIS3, and this test specimen was examined in a 90° bending test using a V-shaped jig (top R 1.5 mm). A cracking-free specimen was judged to be good in bending processability, while a cracked specimen was judged to be poor.

3. Weld cracking test

Figure 2:
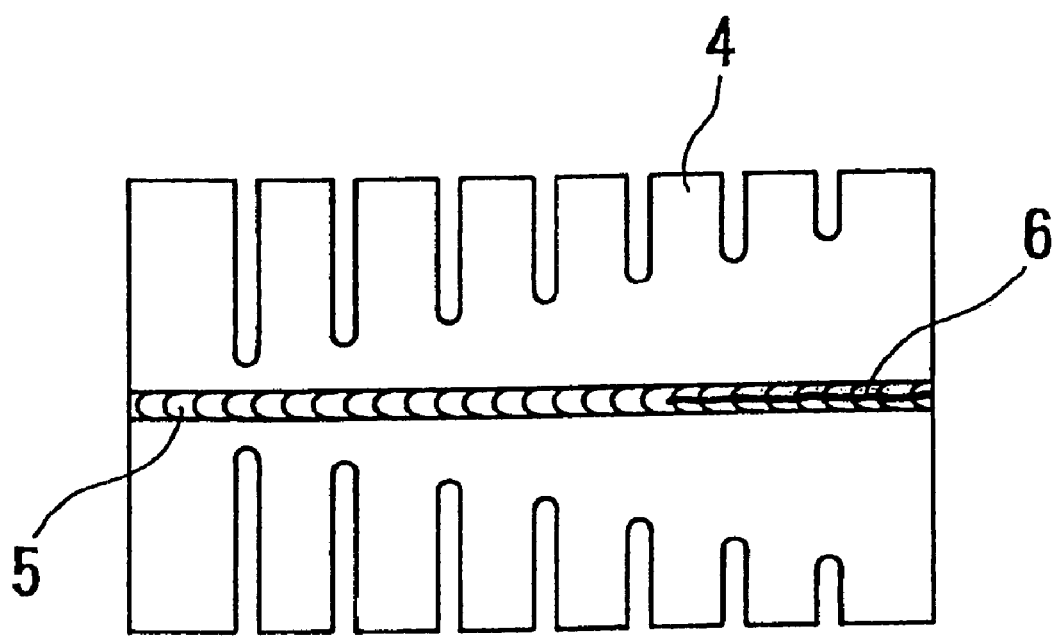
FIG. 2 is a top plan view of a welding crack test specimen.

The sheet material or extruded material with the alloy components shown in Table 1 was processed into a weld-cracking test specimen (fish bone-shaped weld-cracking test specimen) (4) shown in FIG. 2.

A bead (5) was formed in the center of this test specimen, by arc-welding (MIG welding), from the right to left ends, by use of a welding wire of 1.2 mmφ, shown in FIG. 1, and then it was left to cool, and the length of the maximum weld cracking (6) in the bead was measured.

The test was conducted repeatedly 3 times, and the average length of the maximum cracking is shown in Table 1.

TABLE 1

| | | | | | | Composition of Al alloy (wt %) | | | | | | | | Welding |
|---|---|---|---|---|---|---|---|---|---|---|---|---|---|---|
| | No | Si | Mg | Cu | Fe | Zn | Mn | Cr | Ti | Zr | V | Al | Type | wire |
| Examples of the invention | 1 | 1.6 | 0.22 | 0.21 | 0.13 | 0.25 | 0.01 | — | — | — | — | balance | extruded material | 5554 |
| | 2 | 1.6 | 0.62 | 0.5 | 1.0 | 0.7 | 0.5 | 0.1 | 0.1 | — | — | balance | extruded material | 5556 |
| | 3 | 1.6 | 1.20 | 0.9 | 0.6 | 1.1 | — | 0.03 | 0.02 | 0.02 | — | balance | sheet material | 5356 |
| | 4 | 3.2 | 0.22 | 0.9 | 0.3 | 0.5 | 0.05 | — | 0.01 | — | 0.02 | balance | extruded material | 5356 |
| | 5 | 3.2 | 0.62 | 0.5 | 0.6 | 0.9 | 0.6 | — | 0.1 | — | — | balance | extruded material | 5554 |
| | 6 | 3.2 | 1.20 | 0.2 | 1.0 | 0.5 | — | 0.03 | 0.1 | 0.1 | 0.1 | balance | sheet material | 5356 |
| | 7 | 4.9 | 0.22 | 0.5 | 0.3 | 0.8 | — | — | — | — | 0.02 | balance | extruded material | 5356 |
| | 8 | 4.8 | 0.62 | 0.2 | 0.6 | 0.4 | — | — | 0.03 | — | — | balance | sheet material | 5356 |
| | 9 | 4.8 | 1.20 | 1.9 | 1.5 | 1.5 | 1.0 | 0.2 | 0.2 | 0.2 | 0.2 | balance | sheet material | 5356 |
| | 10 | 1.6 | 1.20 | 0.9 | 0.6 | 1.1 | — | 0.03 | 0.02 | 0.02 | — | balance | sheet material | 4043 |
| | 11 | 3.2 | 0.62 | 0.5 | 0.6 | 0.9 | 0.6 | — | 0.1 | — | — | balance | extruded material | 4043 |
| Comparative Examples | 12 | 1.2 | 0.24 | 0.22 | 0.13 | 0.27 | 0.01 | — | — | — | — | balance | extruded material | 5554 |
| | 13 | 3.2 | 0.21 | 0.9 | 0.3 | 0.5 | 0.05 | — | 0.01 | — | 0.02 | balance | sheet material | 1% Mg |
| | 14 | 3.3 | 0.63 | 2.2 | 0.3 | 0.9 | 0.5 | — | 0.1 | — | — | balance | extruded material | 4043 |
| | 15 | 4.8 | 0.62 | 2.2 | 0.6 | 0.4 | — | — | 0.03 | — | — | balance | sheet material | 5356 |
| | 16 | 6.0 | 1.20 | 1.2 | 1.5 | 1.5 | 1.0 | 0.2 | 0.2 | 0.2 | 0.2 | balance | sheet material | 5356 |

| | | Central components in weld (wt %) | | | Joint strength after welding (kN) | Joint heating conditions | Joint strength after heating (kN) | Bending processability | Length of weld cracking (mm) |
|---|---|---|---|---|---|---|---|---|---|
| | No | Si | Mg | Cu | | | | | |
| Examples of the invention | 1 | 0.5 | 1.1 | 0.07 | 7.7 | 150° C. × 20 min. | 9.0 | good | 40 |
| | 2 | 1.0 | 3.6 | 0.28 | 8.6 | 200° C. × 1 hr. | 10.6 | good | 33 |
| | 3 | 0.9 | 3.9 | 0.51 | 9.4 | 200° C. × 1 hr. | 11.6 | good | 44 |
| | 4 | 1.8 | 4.5 | 0.55 | 8.0 | 180° C. × 1 hr. | 9.5 | good | 34 |
| | 5 | 2.1 | 3.6 | 0.29 | 8.7 | 200° C. × 1 hr. | 10.5 | good | 32 |
| | 6 | 2.0 | 4.0 | 0.11 | 9.3 | 180° C. × 1 hr. | 11.0 | good | 38 |
| | 7 | 3.1 | 3.2 | 0.32 | 8.0 | 150° C. × 20 min. | 9.1 | good | 31 |
| | 8 | 3.3 | 3.7 | 0.13 | 8.8 | 220° C. × 8 hr. | 10.9 | good | 34 |
| | 9 | 3.6 | 5.2 | 1.34 | 9.9 | 200° C. × 2 hr. | 12.0 | good | 41 |
| | 10 | 4.5 | 0.7 | 0.56 | 7.3 | — | — | good | 15 |
| | 11 | 5.9 | 0.3 | 0.27 | 7.1 | — | — | good | 13 |

TABLE 1-continued

| | | | | | | | | | |
|---|---|---|---|---|---|---|---|---|---|
| Compar- ative Examples | 12 | 0.47 | 0.9 | 0.12 | 5.3 | 200° C. × 2 hr. | 5.3 | good | 49 |
| | 13 | 2.4 | 0.8 | 0.49 | 5.4 | 200° C. × 2 hr. | 5.5 | good | 39 |
| | 14 | 5.7 | 0.35 | 1.5 | 2.1 | — | — | poor | 40 |
| | 15 | 3.2 | 3.5 | 1.5 | 1.3 | 180° C. × 1 hr. | 1.3 | poor | 51 |
| | 16 | 3.9 | 3.7 | 0.71 | 9.7 | 180° C. × 1 hr. | 11.2 | poor | 36 |

Note: "-" means not-contained.
Alloy composition in welding wire (wt %)
5356: Al-5% Mg-0.12% Mn-0.11% Cr-0.1% Ti alloy
5554: Al-2.8% Mg-0.6% Mn-0.13% Cr-0.1% Ti alloy
5556: Al-5% Mg-0.7% Mn-0.12% Cr-0.1% Ti alloy
1% Mg: Al-1% Mg-0.1% Mn-0.1% Cr-0.1% Ti alloy
4043: Al-5% Si alloy As is apparent from the results in Table 1, Specimen Nos. 12, 13, and 15 of the Comparative examples, which were different in the welded metal components (Nos. 12, 13, 15) and the components in the welding wire (No.13) from the specimens according to the present invention, were poor in joint strength, even when they exhibited good bending workability. Further, their joint strength was not increased even by heating.

Specimen Nos. 12, 14, 15, and 16 of the Comparative examples, which were different in the alloy components in the Al alloy (base metal) from the specimens according to the present invention, were inferior in the mechanical strength of the joint or poor in bending processability of the material (base metal).

On the other hand, Specimen Nos. 1 to 11 according to the present invention were superior in the mechanical strength of the welded joint and good in bending processability of the base metal.

Further, the Specimen Nos.1 to 9 accoding to the present invention welded with a wire (filler metal) containing 2 to 6% of Mg, showed a further increase in the mechanical strength of the joint upon heating.

In addition, Specimen Nos. 10 and 11 according to the present invention, using a welding wire (filler metal) containing 3 to 13% of Si, in the weld-cracking test, were more hardly cracked upon welding, with half or less a length of cracking compared with Specimen Nos. 1 to 9 according to the present invention, which were welded with a wire containing 2 to 6% of Mg.

Having described our invention as related to the present embodiments, it is our intention that the invention not be limited by any of the details of the description, unless otherwise specified, but rather be construed broadly within its spirit and scope as set out in the accompanying claims.

What we claim is:

1. A welded joint comprising:
   approximately 0.5 to 4% silicon;
   approximately 1.0 to 5.5% magnesium;
   approximately 0.05 to 1.4% copper; and
   a balance of aluminum including inevitable impurities.

2. The welded joint of claim 1 wherein said joint is heat treated at at most 220° C.

3. A welded joint comprising:
   approximately 2.0 to 11% silicon;
   approximately 0.05 to 1.4% magnesium;
   approximately 0.05 to 1.8% copper; and
   a balance of aluminum including inevitable impurities.

4. The welded joint of claim 3 wherein said joint is heat treated at at most 220° C.

5. A method of welding comprising:
   forming a joint between two pieces of aluminum alloy base metal wherein the aluminum alloy comprises a percent by weight of:
   approximately 1.5 to 5% silicon;
   approximately 0.2 to 1.5% magnesium;
   approximately 0.2 to 1.5% zinc;
   approximately 0.2 to 2% copper;
   approximately 0.1 to 1.5% iron;
   at least one additional ingredient selected from the group consisting of a percent by weight of approximately 0.01 to 1% manganese, 0.01 to 0.2% chromium, 0.01 to 0.2% titanium, 0.01 to 0.2% zirconium, or 0.01 to 0.2% vanadium;
   a balance of aluminum including inevitable impurities; and
   welding said joint with an aluminum alloy filler material comprising 2 to 6% by weight of magnesium.

6. The method of claim 5 wherein said base metal comprises 2.6 to 5% by weight silicon.

7. The method of claim 5 further comprising heat treating said joint.

8. A welded joint made by the method of claim 5.

9. The welded joint of claim 8 wherein said joint comprises:
   approximately 0.5 to 4% silicon;
   approximately 1.0 to 5.5% magnesium;
   approximately 0.05 to 1.4% copper; and
   a balance of aluminum including inevitable impurities.

10. A method of welding comprising:
    forming a joint between two pieces of aluminum alloy base metal wherein the aluminum alloy comprises a percent by weight of:
    approximately 1.5 to 5% silicon;
    approximately 0.2 to 1.5% magnesium;
    approximately 0.2 to 1.5% zinc;
    approximately 0.2 to 2% copper;
    approximately 0.1 to 1.5% iron;
    at least one additional ingredient selected from the group consisting of a percent by weight of approximately 0.01 to 1% manganese, 0.01 to 0.2% chromium, 0.01 to 0.2

% titanium, 0.01 to 0.2% zirconium, or 0.01 to 0.2% vanadium; a balance of aluminum including inevitable impurities; and welding said joint with an aluminum alloy filler material comprising 3 to 13% by weight silicon.

11. The method of claim 10 wherein said aluminum alloy base metal comprises 2.6 to 5% by weight silicon.

12. The method of claim 10 further comprising heat treating said joint.

13. A welded joint made by the method of claim 10.

14. The welded joint of claim 13 wherein said joint comprises:

approximately 2.0 to 11% silicon;

approximately 0.5 to 1.4% magnesium;

approximately 0.05 to 1.8% copper; and a balance of aluminum including inevitable impurities.

15. An aluminum alloy comprising:

a percent by weight of:

approximately 2.6 to 5% silicon;

approximately 0.2 to 0.8% magnesium;

approximately 0.2 to 1.5% zinc;

approximately 0.2 to 2% copper;

approximately 0.1 to 1.5% iron;

at least one additional ingredient selected from the group consisting of a percent by weight of approximately 0.01 to 1% manganese, 0.01 to 0.2% chromium, 0.01 to 0.2% titanium, 0.01 to 0.2% zirconium, and 0.01 to 0.2% vanadium; and a balance of aluminum including inevitable impurities.

* * * * *